Jan. 30, 1962  B. B. GIRDEN  3,018,579
DEVICE FOR CATCHING FISH AND OTHER SUBMARINE LIFE
Filed June 13, 1960
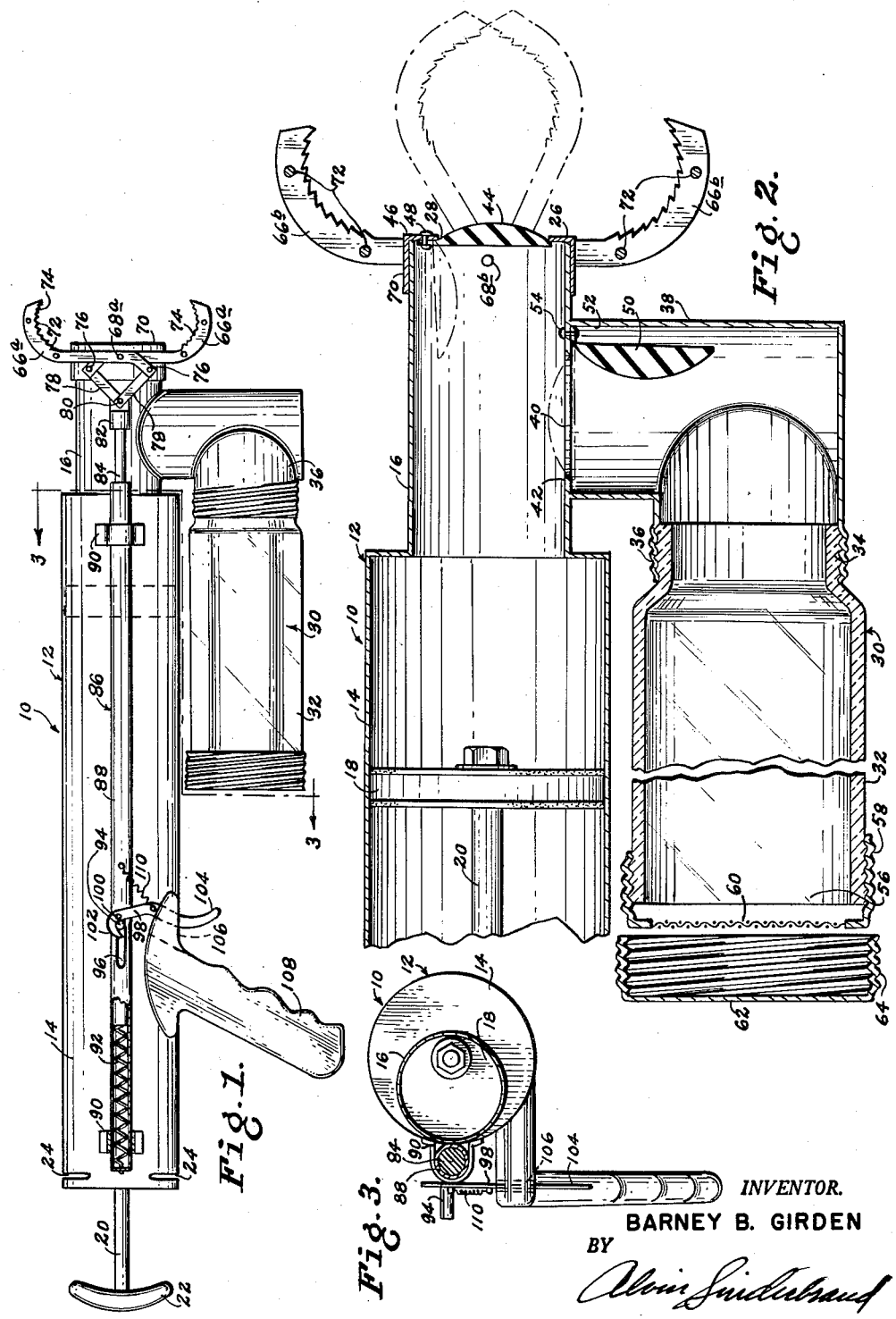
INVENTOR.
BARNEY B. GIRDEN
BY
ATTORNEY

United States Patent Office 3,018,579
Patented Jan. 30, 1962

3,018,579
DEVICE FOR CATCHING FISH AND OTHER SUBMARINE LIFE
Barney B. Girden, 32 W. 76th St., New York 23, N.Y.
Filed June 13, 1960, Ser. No. 35,485
10 Claims. (Cl. 43—4)

This invention relates generally to a device for catching fish and other submarine life, and more particularly is directed to such a device which is suitable for use by skin divers, persons operating fish hatcheries or persons engaged in underwater exploration and research.

Heretofore, only spear guns or other similar devices projecting a pointed and barbed element to which a fishing line is attached have been available to skin divers for the purpose of catching fish or other submarine animals. Such spear guns or the like have the disadvantage of mortally wounding the fish that is caught so that it is of no use in the gathering of specimens for aquariums or other research facilities that require live submarine animals for either exhibition or study. Further, the existing spear guns or the like are dangerous weapons and, when in the hands of an unskilled or reckless skin diver, such weapons constitute a continuous source of danger to other swimmers or skin divers in the surrounding area. It is also obvious that spear guns or the like are suitable only for catching relatively large fish or other submarine life, and are successfully used even for that purpose only by highly skilled users.

Accordingly, it is an object of this invention to provide a device for catching fish and other submarine life that is safe and easy to use, and that permits the catching of either large or small specimens without inflicting any mortal injuries.

Another object is to provide a device of the described character that can be employed for taking samples of minute submarine animal or plant life.

In accordance with an aspect of this invention, a device for catching fish and other submarine life includes a cylinder which is provided with an opening at one end and with a piston that is axially reciprocable within the cylinder so that, when the piston is displaced away from the open end of the cylinder with at least such open end being submerged, a strong flow of water is produced into the open end of the cylinder and that strong flow carries along fish or other submarine life which is conveniently entrapped by the device.

In an embodiment of this invention, gripping elements are movably mounted on the cylinder adjacent the open end thereof and are connected to an actuating mechanism which is operative to rapidly displace the gripping elements from an open or extended position to a closed position in which the gripping elements can grasp a relatively large fish or other submarine animal drawn against the open end of the cylinder by the strong or rapid flow of water into the latter.

In accordance with another feature of this invention, a sample or specimen container is preferably removably attached to the cylinder adjacent the open end of the latter, and first and second check valves are provided at the open end of the cylinder and between the cylinder and sample or specimen container, respectively, with the first check valve permitting flow through the open end of the cylinder only in the direction towards the interior of the latter, and with the second check valve permitting flow only in the direction from the cylinder towards the sample or specimen container. Thus, when the piston is moved within the cylinder in the direction away from the open end of the latter, the first check valve opens and the second check valve closes so that a strong flow of water enters the cylinder along with the submarine animal and plant life carried along by such flow, and, when the piston is subsequently moved towards the open end of the cylinder, the first check valve closes and the second check valve opens to permit the water, and the submarine animal and plant life contained therein to enter the sample or specimen container.

The above, and other objects, features and advantages of the invention, will be apparent in the following detailed description of an illustrative embodiment thereof which is to be read in connection with the accompanying drawing forming a part hereof, and wherein:

FIG. 1 is a side elevational view, partly broken away and in section, of a device for catching fish and other submarine life, which device is constructed in accordance with an embodiment of this invention;

FIG. 2 is an enlarged axial sectional view of a portion of the device shown in FIG. 1; and FIG. 3 is a transverse sectional view taken along the line 3—3 of FIG. 1.

Referring to the drawing in detail, it will be seen that a device for catching fish and other submarine life in accordance with the present invention is there generally identified by the reference numeral 10 and includes a pump cylinder 12 preferably having a relatively long large diameter portion 14 and a relatively short, smaller diameter portion 16 extending axially from one end of portion 14. As shown in FIG. 2, a piston 18 is axially reciprocable within large diameter portion 14 of cylinder 12 and is connected to one end of a piston rod 20 which projects slidably through the end of portion 14 remote from portion 16, and which has a handle 22 suitably secured to its projecting end. As shown in FIG. 1, cylinder portion 14 is preferably formed with slots or openings 24 adjacent the end through which piston rod 20 slidably projects so that fluid may easily enter and escape through such slots or openings 24, thereby to respectively avoid the development of a suction in cylinder portion 14 to the left of piston 18, as viewed in FIG. 2, during movement of the piston towards the right, and the build up of pressure within cylinder portion 14 to the left of piston 18 resisting the movement of the latter towards the left.

As shown in FIG. 2, the end of cylinder portion 16 remote from portion 14 has a radially inwardly directed flange or rim 26 defining a valve seat around an opening 28 at the corresponding end of pump cylinder 12. Since the cross sectional area of cylinder portion 14 is substantially greater than the cross sectional area of cylinder portion 16, and particularly the area of opening 28, it will be apparent that the rapid movement of piston 18 towards the left, that is, in the direction away from opening 28, will produce a high velocity flow of fluid into cylinder 12 through the opening 28 thereof. When at least the opening 28 of pump cylinder 12 is submerged in water during such stroking of piston 18, it has been found that fish and other submarine life are powerless to resist, and are carried along by the high velocity flow of water and are either drawn into cylinder 12, if small enough to pass through opening 28, or are drawn against opening 28 and there strongly held by the suction resulting from the continued movement of piston 18 in the direction away from opening 28.

In a preferred embodiment of the invention, as illustrated in the drawing, fish and other submarine life that are small enough to pass through opening 28 into the interior of cylinder 12 are preferably deposited in a specimen or sample container 30 which is connected to pump cylinder 12 and retains the captured specimens during repeated stroking of piston 18. As shown in FIG. 2, sample or specimen container 30 may include a generally cylindrical body 32 which is preferably formed of a transparent material, such as, glass, plastics or the like, and has an externally threaded neck 34 adapted to be removably screwed into a correspondingly threaded coupling portion 36 of an extension 38 projecting radially from cylinder portion 16. An opening 40 is provided in the wall of cylinder portion 16 to provide communication between the latter and extension 38, and a rim or radially inwardly directed flange 42 extends around opening 40 to form a valve seat.

A first check valve 44, which may be of rubber or other suitably resilient material, is provided with a flexible tab 46 projecting from its periphery, and secured to the rim 26 around opening 28, for example, by one or more rivets 48, so that check valve 44 is hingedly mounted for swinging movement between the closed position illustrated in FIG. 2, where valve 44 extends across opening 28 and seats against the inside of rim 26, and an open position shown in broken lines on FIG. 2.

The device 10 further includes a second check valve 50, also preferably formed of rubber or other suitably resilient material, and having a peripheral tab 52 secured to rim 42, as by one or more rivets 54, for swinging movement between an open position where check valve 50 depends from rim 42 into extension 38, as shown in full lines on FIG. 2, and a closed position represented in broken lines on FIG. 2, where valve 50 extends across opening 40 and seats against the underside of rim 42, and to which valve 50 is yieldably urged by the resilience of the material of which it is formed.

As shown in FIG. 2, the end of body 32 of sample or specimen container 30 remote from its threaded neck 34 is open, as at 56, and is provided with a replaceable closure which is preferably in the form of a threaded rim 58 engageable with corresponding threads on the adjacent end portion of body 32, and screening 60 secured at its periphery, as by soldering or the like, to rim 58.

It will be apparent that, when piston 18 is reciprocated toward the left and right, as viewed in FIG. 2, the check valves 44 and 50 first open and close, respectively, and then close and open, respectively, so that quantities of water and the fish and other submarine life contained therein, are drawn into cylinder 12 and then pumped from the latter into sample or specimen container 30. During repeated operation of the pump piston 18, the relatively large quantities of water drawn into cylinder 12 and then pumped into container 30 escape from the latter through the screening 60, while the fish and other submarine life that are too large to pass through the openings of screening 60 are retained within the sample or specimen container. Since the closure of the sample container 30 formed by rim 58 and screening 60 is removable from body 32, it is apparent that several screened closures may be provided having different size mesh openings in the screening 60 thereof, so that the sizes of the fish and other submarine life to be retained within sample container 30 may be suitably varied.

When the desired specimens have been accumulated in container 30, a solid cover 62 having a threaded flange or rim 64 is screwed over rim 58 of the screened closure to seal the end of container 30 remote from neck 34. Then, the device 10 can be elevated, that is, disposed with the axes of cylinder 12 and container 30 extending substantially vertical, and with the neck 34 of the container directed upwardly, so that, when the container is unscrewed from the coupling 36, the water and fish or other submarine life will remain in the container which can be sealed by a suitable threaded cap or closure screwed onto the threaded neck 34. Accordingly, it will be apparent that a number of sample or specimen containers 30 can be successively filled with the desired specimens.

The device 10 is also intended to be used for the catching of fish or other submarine life that are too large to pass through the opening 28 of cylinder 12. For this purpose, the device 10 further preferably includes pairs of gripping elements or jaws 66a and 66b arranged at the opposite sides of the free end of cylinder portion 16, as shown in FIGS. 1 and 2, respectively, and being pivotally mounted on pivot pins 68a and 68b arranged at diametrically opposed locations on a mounting collar 70 that is suitably secured to cylinder portion 16. The gripping elements or jaws 66a and 66b are preferably joined together, as by laterally extending rods 72, so that both pairs of gripping elements will swing simultaneously about their respective pivots between open positions shown in full lines on FIGS. 1 and 2, and a closed position shown in broken lines on FIG. 2.

As shown in FIG. 1 with respect to the pair of gripping elements or jaws 66a, each of the gripping jaws is in the form of a two-armed lever having a relatively long curving arm formed with gripping teeth 74 along its inner concave edge and a relatively short arm which, at its free end, carries a pivot pin 76 forming a connection to one end of a related link 78 having its other end pivotally connected, as by a pivot 80, to an apertured lug 82 secured to the end of an actuating rod 84.

The actuating rod 84 forms part of an actuating mechanism 86 that further includes a tube 88 having rod 84 axially slidable therein, and being disposed along one side of cylinder portion 14 and secured to the latter, as by clamps 90. A spring 92 (FIG. 1) or other resilient member is connected to the inner end of rod 84 and to the end of tube 88 remote from the gripping elements or jaws so as to yieldably urge rod 84 into tube 88, that is, toward the left as viewed in FIG. 1, which movement of rod 84 causes displacement of the gripping elements or jaws 66a and 66b towards their closed positions. In order to effect movement of the gripping elements or jaws toward their open positions, the actuating mechanism 86 further includes a pin 94 (FIGS. 1 and 3) projecting radially from rod 84 through an elongated, axial slot 96 formed in tube 88 so that the pin or handle 94 may be manually displaced toward the right, as viewed in FIG. 1, for opening the gripping elements or jaws. The gripping elements or jaws are releasably retained in their illustrated opened positions by means of a trigger 98 (FIGS. 1 and 3) rockable on a pivot pin 100 extending from tube 88 and having a hooked or latch end portion 102 that is engageable with pin or handle 94 and a finger engageable portion 104 that extends downwardly, for example, through a slot 106 shown in broken lines on FIGS. 1 and 3 and which is formed in a pistol grip or handle 108 that is suitably secured to cylinder portion 14. A tension spring 110 is connected, at its opposite ends, to tube 88 and trigger 98 so as to urge the latter to pivot in the direction engaging its latch portion 102 with pin 94, as in FIG. 1.

As shown in FIG. 3, cylinder portion 16 may have its center laterally offset with respect to the center of cylinder portion 14 by a distance substantially equal to the difference between the respective radii of the two cylinder portions so that cylinder portion 16 is substantially flush with cylinder portion 14 at the side of cylinder 12 along which tube 88 extends, thereby making it possible to connect gripping elements or jaws 66a directly to lug 82 by means of the links 78.

When using the device 10 embodying the present invention for catching relatively large fish or other specimens of submarine life, actuating mechanism 86 is initially operated, by manipulation of handle or pin 94, so as to move gripping elements or jaws 66a and 66b to their open or extended positions, and the trigger 98 then retains pin 94 in the position corresponding to the open positions of the gripping elements. When the skin diver or other user of device 10 observes a fish that is to be caught, handle 22 is pulled toward the left, as viewed in FIG. 1, thereby inducing a high speed flow of water into the opening 28 of cylinder portion 16 by reason of the difference between the cross-sectional areas of cylinder portions 14 and 16. Such high speed flow of water attracts or draws the fish against opening 28 and the finger engageable portion 104 of trigger 98 is then drawn against pistol grip or handle 108 so as to release latch portion 102 from pin 94 and thereby permit spring 92 to displace rod 84 in the direction moving gripping elements or jaws 66a and 66b toward their closed positions where the gripping elements or jaws are operative to trap or grasp the fish drawn against opening 28. The spring 92 may be dimensioned so that the closing action of the gripping jaws or elements, while being rapid enough to ensure the catching of the fish, is not too forceful and thereby avoids the inflicting of mortal injuries to the caught fish. After a fish has been caught, in the manner described above, handle or pin 94 of actuating mechanism 86 may again be manipulated to displace the gripping jaws or elements to their open positions while the fish is grasped for placement in a creel or other similar container.

It will be apparent that, while the device 10 is employed for the catching of a relatively large fish or the like, as described above, other samples of submarine life may be simultaneously taken in the sample or specimen container 30, as previously described. Thus, the device 10 embodying this invention may be employed for taking either large or small samples of submarine life and, by reason of its absence of any harpoons, spears, darts or the like which are forcefully projected a substantial distance, as in existing spear guns, the device 10 may be safely used and requires little or no skill for its successful operation. Since the device 10 does not mortally injure the fish or other specimens of submarine life which are caught or taken thereby, it is apparent that the device 10 may be usefully employed in fish hatcheries, for example, in transferring stock from the large tanks in which they are grown to portable containers used for transporting the stock to streams or the like, and that the device 10 is further useful for obtaining specimens for aquariums, or for use in scientific underwater research.

Although an illustrative embodiment of the invention has been described in detail herein with reference to the accompanying drawing, it is to be noted that the invention is not limited to that precise embodiment, and that various changes and modifications may be effected therein without departing from the scope or spirit of the invention, except as defined in the appended claims.

What is claimed is:

1. A device for catching submarine life comprising a cylinder having an opening at one end, a piston movable axially in said cylinder, means for axially displacing said piston relative to said cylinder, a sample container, means connecting said sample container to said cylinder adjacent said one end of the latter, valve means at said one end of the cylinder and between said container and cylinder, said valve means operating to close the communication between said container and cylinder during movement of said piston away from said one end so that, when at least said one end of the cylinder is submerged in water, a flow of water is drawn into the cylinder, and to close said one end of the cylinder during movement of the piston toward said one end so that the water previously drawn into the cylinder is pumped into said container along with any submarine life in such water small enough to pass through said opening, gripping jaws movably mounted on said cylinder at said one end of the latter to move between open extended positions and closed positions where said jaws are operative to grasp a relatively large specimen of submarine life drawn against said one end of the cylinder by the flow of water into the latter, and actuating means for said gripping jaws operative to rapidly displace the latter from said open positions to said closed positions.

2. A device as in claim 1; wherein said gripping jaws are pivotally mounted on the cylinder, and said actuating means includes an axially movable rod mounted on said cylinder, toggle joint means connecting said rod to said jaws so that the latter swing between said open and closed positions in response to axial movement of said rod, resilient means urging said rod in the direction for moving said jaws to said closed positions, and trigger operated latch means releasably holding said rod against movement by said resilient means in an axial position corresponding to said open positions of said jaws.

3. A device as in claim 2; wherein said cylinder includes a relatively small diameter end portion at said one end portion so that a high speed flow of water is drawn through said one end in response to movement of said piston away from said one end; and wherein said small diameter end portion is laterally offset relative to the remainder of said cylinder so that said end portion and said remainder are flush with each other at one side of the cylinder, and said rod of the actuating means is axially slidable in a tube extending along said one side of the cylinder.

4. A device for catching submarine life comprising a cylinder having an opening at one end, a piston movable axially in said cylinder, means for axially displacing said piston relative to said cylinder so that, during displacement of said piston away from said one end with the latter submerged in water, a strong flow of water is drawn into the cylinder through said one end to attract submarine life in the water toward said one end of the cylinder, gripping jaws movably mounted on said cylinder at said one end of the latter to move between open extended positions and closed positions where said jaws are operative to grasp a specimen of submarine life drawn against said one end of the cylinder by the flow of water into the latter, and actuating means for said gripping jaws operative to rapidly displace the latter from said open positions to said closed positions.

5. A device as in claim 4; wherein said gripping jaws are pivotally mounted on the cylinder, and said actuating means includes an axially movable rod mounted on said cylinder, toggle joint means connecting said rod to said jaws so that the latter swing between said open and closed positions in response to axial movement of said rod, resilient means urging said rod in the direction for moving said jaws to said closed positions, and trigger operated latch means releasably holding said rod against movement by said resilient means in an axial position corresponding to said open positions of said jaws.

6. A device as in claim 5; wherein said cylinder includes a relatively small diameter end portion at said one end portion so that a high speed flow of water is drawn through said one end in response to movement of said piston away from said one end; and wherein said small diameter end portion is laterally offset relative to the remainder of said cylinder so that said end portion and said remainder are flush with each other at one side of the cylinder, and said rod of the actuating means is axially slidable in a tube extending along said one side of the cylinder.

7. A device as in claim 1; wherein said container is removably connected to said cylinder for detachment from the latter following the trapping of the desired submarine life in said container.

8. A device as in claim 1; wherein said container has a screened opening to permit the escape of water from the container during the pumping of water into the latter along with the submarine life in the water.

9. A device as in claim 1; wherein said container has an opening spaced from the means connecting said container to said cylinder, and a screened closure removably secured to said container across said opening so that water can escape from the container through said screened closure while the mesh openings of the latter are selected to retain the desired submarine life in said container.

10. A device as in claim 1; wherein said cylinder has a relatively small diameter end portion at said one open end of the cylinder so that movement of said piston away from said one end causes a high speed flow of water through said small diameter end portion to exert a strong attraction on submarine life in the water.

References Cited in the file of this patent

UNITED STATES PATENTS

| | | |
|---|---|---|
| 182,737 | Adair | Oct. 3, 1876 |
| 714,738 | Perry | Dec. 2, 1902 |
| 1,556,426 | Coop | Oct. 6, 1925 |
| 1,559,978 | Page | Nov. 3, 1925 |
| 2,672,987 | Hutchinson | Mar. 23, 1954 |

FOREIGN PATENTS

| | | |
|---|---|---|
| 7,738 | Great Britain | 1914 |
| 1,115,015 | France | Dec. 26, 1955 |